US008503320B2

(12) United States Patent  
Ekelin et al.

(10) Patent No.: US 8,503,320 B2
(45) Date of Patent: Aug. 6, 2013

(54) AVAILABLE BANDWIDTH ESTIMATION IN A PACKET-SWITCHED COMMUNICATION NETWORK

(75) Inventors: Svante Ekelin, Vallentuna (SE); Erik Bergfeldt, Norrköping (SE); Christofer Flinta, Stockholm (SE); Andreas Johnsson, Uppsala (SE); Jan-Erik Mångs, Solna (SE); Bob Melander, Sigtuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 384 days.

(21) Appl. No.: 12/933,875

(22) PCT Filed: Mar. 23, 2009

(86) PCT No.: PCT/IB2009/000576
§ 371 (c)(1),
(2), (4) Date: Dec. 20, 2010

(87) PCT Pub. No.: WO2009/118602
PCT Pub. Date: Oct. 1, 2009

(65) Prior Publication Data
US 2011/0090811 A1  Apr. 21, 2011

Related U.S. Application Data

(60) Provisional application No. 61/039,539, filed on Mar. 26, 2008.

(51) Int. Cl.
*G08C 15/00* (2006.01)
(52) U.S. Cl.
USPC ........................................................ 370/252

(58) Field of Classification Search
None
See application file for complete search history.

(56) References Cited

U.S. PATENT DOCUMENTS

| 2002/0116154 | A1  | 8/2002  | Nowak et al. |
| 2002/0150044 | A1* | 10/2002 | Wu et al. ........................ 370/229 |
| 2007/0115849 | A1  | 5/2007  | Ekelin et al. |
| 2008/0144663 | A1* | 6/2008  | Johnson et al. ............... 370/469 |

OTHER PUBLICATIONS

PCT International Search Report, mailed Oct. 1, 2009, in connection with International Application No. PCT/IB2009/000576.
PCT Written Opinion, mailed Oct. 1, 2009, in connection with International Application No. PCT/IB2009/000576.

(Continued)

*Primary Examiner* — Jianye Wu
(74) *Attorney, Agent, or Firm* — Potomac Patent Group PLLC

(57) ABSTRACT

A system and method for determining end-to-end available bandwidth of a path in a packet-switched communication network. A multi-rate packet chirp injector injects probe traffic packets at different probing rates, u, into the network utilizing a probe chirp. A receiver samples time separation of the probe traffic packets to generate time-separation samples, which are used to calculate relative inter-packet separation strain, $\epsilon$, samples at different probing rates. An Expectation-Maximization, EM, analyzer utilizes an EM algorithm to identify useful strain $\epsilon$ samples and to estimate parameters of a line $l_2$ representing a direct linear relationship between the probing rate and the inter-packet separation strain $\epsilon$ at probing rates greater than a break point. A filter such as, for example, a Kalman filter then determines the available bandwidth of the network path based on the estimated parameters of the line $l_2$.

18 Claims, 8 Drawing Sheets

OTHER PUBLICATIONS

Ekelin, S. et al. "Real-Time Measurement of End-to-End Available Bandwidth using Kalman Filtering" Network Operations and Management Symposium, 2006, 10th IEEE/IFIP Vancouver, BC, Canada, Apr. 3-7, 2006, Piscataway, NJ, USA, IEEE, Apr. 3, 2006, pp. 73-84, XP010935669.

Ribeiro, J.V. et al. "PathChirp: Efficient Available Bandwidth Estimation for Network Paths" [Online] Jan. 2008, pp. 1-11, XP002547163l. Retrieved from the Internet: URL: http://whitepapers.silicon.com/0,39024759,60403078p,00.htm>.

* cited by examiner

AVAILABLE BANDWIDTH ESTIMATION IN A PACKET-SWITCHED COMMUNICATION NETWORK

CROSS-REFERENCE TO RELATED APPLICATIONS

This application claims priority under 35 U.S.C. §119 to U.S. Provisional Patent Application No. 61/039,539 filed Mar. 26, 2008, which is hereby incorporated herein by reference in its entirety

TECHNICAL FIELD

The present invention relates to communication networks. More specifically, and without limitation, the invention is directed to a method of determining the end-to-end available bandwidth in a packet-switched communication network.

BACKGROUND

The available bandwidth of a network path is the unused traffic capacity from end-to-end over the path. The capability of measuring the end-to-end available bandwidth of a communication network is useful in several contexts including admission control, service level agreement verification, intelligent routing, server selection, and network monitoring. The end-to-end available bandwidth can be determined by applying active measurement tools to identify the "weakest link in the chain", the bottleneck link.

Several available-bandwidth measurement tools have been developed throughout the years. The majority of these are based on the probe rate model (PRM), which relies on self-induced congestion, i.e., injection of probe traffic at rates high enough to transiently overload the bottleneck link of the network path. The available bandwidth is strongly correlated to the probing-rate dependence of changes of the inter-packet time separation between consecutive packets. This time separation is expected to increase in case of congestion, which is observable at the probe receiver. This makes it feasible to estimate the available bandwidth, provided one has a reasonable model of the dependence of the time-separation increase on the probing rate and the available bandwidth.

If probe packets are sent at rates lower than the available bandwidth, the arrival rate of the probe packets at the receiver is expected to match the used transmission rate. If the probe-packet rate is higher than the minimum unused capacity, congestion occurs in the bottleneck router and the probe packets will be delayed; this increases the inter-packet time separation, which is observable at the probe receiver. By transmitting probe packets at various rates, it is feasible to measure the available bandwidth by identifying the point of congestion, i.e., the probe rate where the time separation starts to increase.

Other available-bandwidth measurement tools are based on a probe gap model (PGM). The PGM estimates the amount of cross traffic at the bottleneck router by exploiting the information in time-gap variations between two consecutive probe packets. The available bandwidth is estimated by subtracting the measured cross traffic from the bottleneck-link capacity.

In practice, PRM-based tools are more reliable than PGM tools, since the latter require knowledge of the bottleneck-link capacity in order to deliver reliable estimates. In addition, PGM tools also assume that the bottleneck link (i.e., the link with the minimum unused capacity) is the same as the narrow link (i.e., the link with the minimum capacity), which is not necessarily the case in reality.

In co-pending U.S. Patent Application Publication No. 2007/0115849, a bandwidth estimation method of this type, referred to as BART, is disclosed. The BART method applies Kalman filtering to bandwidth estimation. Kalman filtering is a numerical method allowing (under certain conditions) real-time estimation ("tracking") of a system state which is not directly observable, but which can be indirectly measured by means of an observable quantity dependent on the system state. Kalman filtering has been successfully applied in many other engineering fields, but the BART method was the first time it was applied to the problem of estimating the available bandwidth of a network path.

FIG. 1 is a graphical representation of a model of inter-packet time separation change, or strain ($\epsilon$), as a function of the probing rate, or probe traffic intensity (u). The strain $\epsilon$ is essentially zero, following line $l_1$, until the probe traffic intensity reaches a level at which there is a break point 10. The break point is indicative of the available bandwidth (B). In an overload range above the break point, the strain $\epsilon$ increases linearly with increasing probe traffic intensity, following line $l_2$. This linear relationship allows for Kalman filtering.

In the BART method, a sequence of probe-packet pairs, typically organized as a probe train, is transmitted for each measurement of the available bandwidth. The probe-packet rates are randomly chosen but constant for all packets within a probe sequence. Thus, the train of probe packets is transmitted equidistant in time, i.e., a number of probe pairs are sent at the same probing rate. The average inter-packet separation strain $\epsilon$ of all packet pairs in a measurement is used as the input to the Kalman filter; the output of the filter is the estimate of the sloping straight line $l_2$.

Another known approach, referred to as pathChirp, injects probe packets that are not equidistant in time. Rather, the inter-packet time separation varies at the sender. This enables sampling at a wide range of probing rates at each sampling. PathChirp, however, employs a less efficient analysis method which does not take advantage of filtering methods such as Kalman filtering.

SUMMARY

The present invention provides a solution to a weakness in the BART method, namely, that each sampling of the system state only gives one point on the u-$\epsilon$ plane depicted in FIG. 1. Useful information is then only obtained if this point is in the overload range to the right of the break point 10. If not, the sample is discarded. For each sample, the probing rate is selected at random. If the selected probing rate is too low or too high, the usefulness of the measured time separation is negligible. Since it is difficult to determine the optimal choice of probing rate beforehand, many samples are discarded, and a large number of samples may be required before enough information is gathered to allow for a reasonable estimate of the break point.

An exemplary embodiment of the present invention is referred to as Expectation-Maximization Active Probing (E-MAP). In the E-MAP method, each sampling of the system uses chirps, i.e., probe-packet trains covering a wide range of probe rates in each measurement. Each chirp provides several points in the u-$\epsilon$ plane. Useful information is gathered more quickly and efficiently. Still, the advantages of filtering are maintained.

The E-MAP method reduces the risk of making inappropriate probe-rate choices by covering a wide range of rates with each sample. Most likely, this generates both useful and useless information, but an Expectation-Maximization (EM) algorithm in E-MAP is able to automatically determine whether measured time separations should be discarded or further utilized in the available-bandwidth analysis.

Thus in one embodiment, the present invention is directed to a method of determining end-to-end available bandwidth of a path in a packet-switched communication network. The method includes the steps of injecting probe traffic packets into the network utilizing a probe chirp comprising a plurality of probe traffic packets, wherein at least some of the probe traffic packets are sent at different probing rates (u); sampling by a receiver, time separation of the probe traffic packets, to generate time-separation samples; and calculating relative inter-packet separation strain ($\epsilon$) samples of the probe traffic packets in the probe chirp utilizing the time-separation samples at different probing rates. An EM algorithm is utilized to identify useful strain $\epsilon$ samples and to estimate parameters of a line $l_2$ representing a direct linear relationship between the probing rate and the inter-packet separation strain $\epsilon$ at probing rates greater than a break point. The method then calculates the available bandwidth of the network path in real time based on the estimated parameters of the line $l_2$.

The injected probe traffic packets may be organized as individual pairs of packets sent at different probing rates, or as trains of several packets sent at different probing rates. The available bandwidth may be calculated as the probing rate at a point at which the line $l_2$ intersects an axis $\epsilon=0$.

In another embodiment, the present invention is directed to a system for determining end-to-end available bandwidth of a path in a packet-switched communication network. The system comprises a multi-rate packet chirp injector, a receiver, an EM analyzer, and a filter. The multi-rate packet chirp injector injects probe traffic packets into the network utilizing a probe chirp comprising a plurality of probe traffic packets, wherein at least some of the probe traffic packets are sent at different probing rates (u). The receiver samples time separation of the probe traffic packets to generate time-separation samples. The receiver also calculates relative inter-packet separation strain $\epsilon$ samples of the probe traffic packets in the probe chirp utilizing the time-separation samples at different probing rates. The EM analyzer includes means for utilizing an EM algorithm to identify useful strain $\epsilon$ samples and to estimate parameters of a line $l_2$ representing a direct linear relationship between the probing rate and the inter-packet separation strain $\epsilon$ at probing rates greater than a break point. The EM analyzer also includes output means for outputting the estimated parameters of the line $l_2$. The filter, which may be a Kalman filter, receives the estimated parameters of the line $l_2$ and determines the available bandwidth of the network path based on the estimated parameters of the line $l_2$.

The means for utilizing an EM algorithm may include means for assigning calculated points in a u-$\epsilon$ plane to the line $l_2$ and to a line $l_1$ of zero strain $\epsilon$, and means for determining maximum likelihood estimates of the parameters of lines $l_1$ and $l_2$. The system may also include means for analyzing the maximum likelihood estimates of the parameters of lines $l_1$ and $l_2$ to determine whether sufficient convergence has been reached between the calculated points in the u-$\epsilon$ plane and the estimated parameters of lines $l_1$ and $l_2$, and means for performing additional iterations of the EM algorithm if sufficient convergence has not been reached. In this embodiment, the output means for outputting the estimated parameters of the line $l_2$ outputs the estimated parameters when sufficient convergence has been reached. The filter then determines the available bandwidth as the probing rate at which line $l_2$ intersects the axis $\epsilon=0$.

In another embodiment, the present invention is directed to an Expectation-Maximization (EM) analyzer for use in a system for determining end-to-end available bandwidth of a path in a packet-switched communication network, wherein the system includes a multi-rate packet chirp injector that injects probe traffic packets into the network at a plurality of probing rates (u), wherein at least some of the probe traffic packets are sent at different probing rates. The EM analyzer includes means for receiving inter-packet separation strain $\epsilon$ samples from a strain-calculating device; and means for utilizing an EM algorithm to identify useful strain $\epsilon$ samples from the strain $\epsilon$ samples received. A line assigning unit assigns calculated points in the u-$\epsilon$ plane to the line $l_2$ and to a line $l_1$. A maximum likelihood estimating unit estimates parameters of a line $l_2$ representing a direct linear relationship between the strain $\epsilon$ and the probing rate at probing rates greater than a break point. The EM analyzer also includes means for sending the maximum likelihood estimates of the parameters of the line $l_2$ to a Kalman filter for determining the available bandwidth of the network path based on the estimated parameters of the line $l_2$.

The present invention produces an available bandwidth estimate quickly by measuring the network path with chirps, and by automatically identifying and discarding inapplicable probe measurements using the EM algorithm. No communication is required from the probe-packet receiver to the probe-packet injector. The invention can also detect multiple congested links in the path, in which case there are several break points between straight line segments as opposed to the single break point in FIG. 1. The process is suitable for filtering for enhanced performance.

BRIEF DESCRIPTION OF THE DRAWINGS

In the following, the essential features of the invention will be described in detail by showing preferred embodiments, with reference to the attached figures in which.

DETAILED DESCRIPTION

Figure 2:
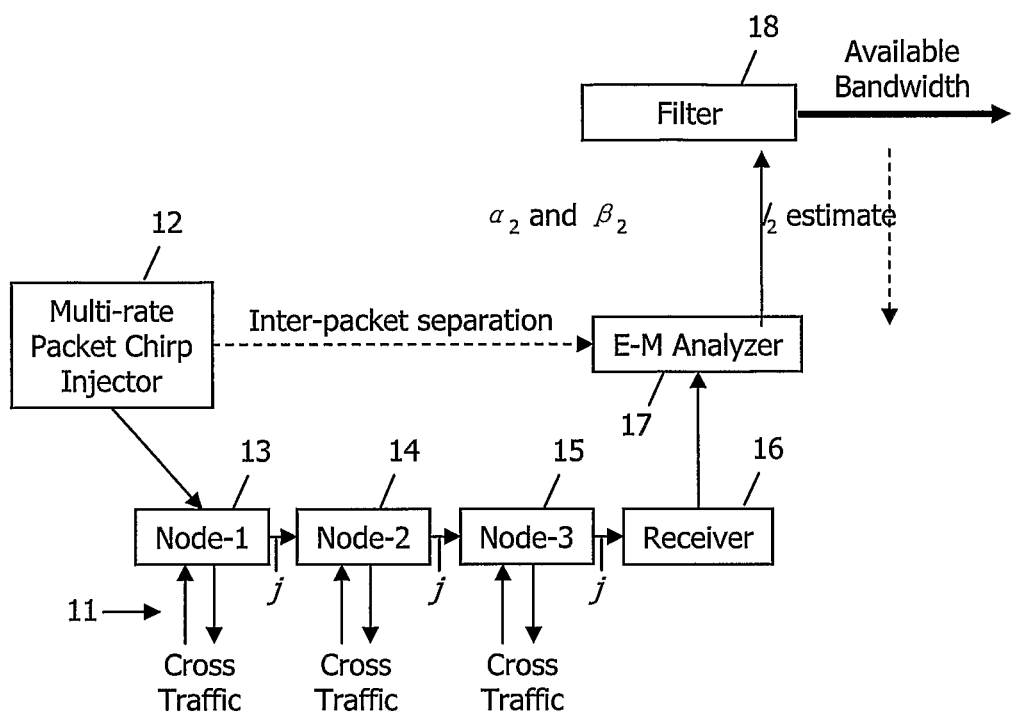
FIG. 2 is a simplified block diagram of an exemplary embodiment of the system of the present invention.

FIG. 2 is a simplified block diagram of an exemplary embodiment of the system of the present invention. An exemplary network is shown with cross traffic 11 being transported through the network. A multi-rate packet chirp injector 12 injects a sequence of probe packets into the network. The probe packets may be organized as individual pairs or trains of several packets sent at different probe traffic rates or intensities (u). The cross traffic and the probe packets travel through the network, which may include a number of nodes 13-15 such as switches and/or routers. A receiver 16 samples the time-separation of packets in real time. Based on the time-separation samples and knowledge of the probe chirp characteristics, the receiver calculates the relative inter-packet time separation strain $\epsilon$ of each probe-packet pair in the probe chirp. The time-separation samples are analyzed and compared to the time-separation of the packets at the injector 12 to determine the inter-packet strain $\epsilon$. An E-M analyzer 17 then utilizes the EM algorithm to identify useful strain $\epsilon$ samples and estimate the line $l_2$. The strain is then used as the measured quantity of the bottleneck-link characteristics. A filter 18 such as, for example, a Kalman filter may be utilized for enhanced tracking performance of the available bandwidth. Optionally, the filter may feed back a maximum-likelihood estimate of the line $l_2$ to the E-M analyzer 17. It should be noted that other types of filters may also be utilized with the present invention, and the use of a Kalman filter is merely one exemplary embodiment.

Over a network path, each link j has a certain capacity $C_j$. This is the highest possible throughput capacity over the link. C is typically constant in wired networks but not for wireless links. The cross traffic 11, or link load, for each link j is denoted $X_j$. X is likely to vary on short time scales. The time-varying available bandwidth of link j is defined as $B_j = C_j - X_j$.

One of the links along the path has the smallest value of available bandwidth. This link is called the bottleneck link, or the tight link, and it determines the available bandwidth of the path. Hence, for a network path from the injector 12 to the receiver 16, the available bandwidth is defined as the minimum available bandwidth considering all links j along the path:

$$B = \min_j (C_j - X_j) \quad (1)$$

Figure 1:
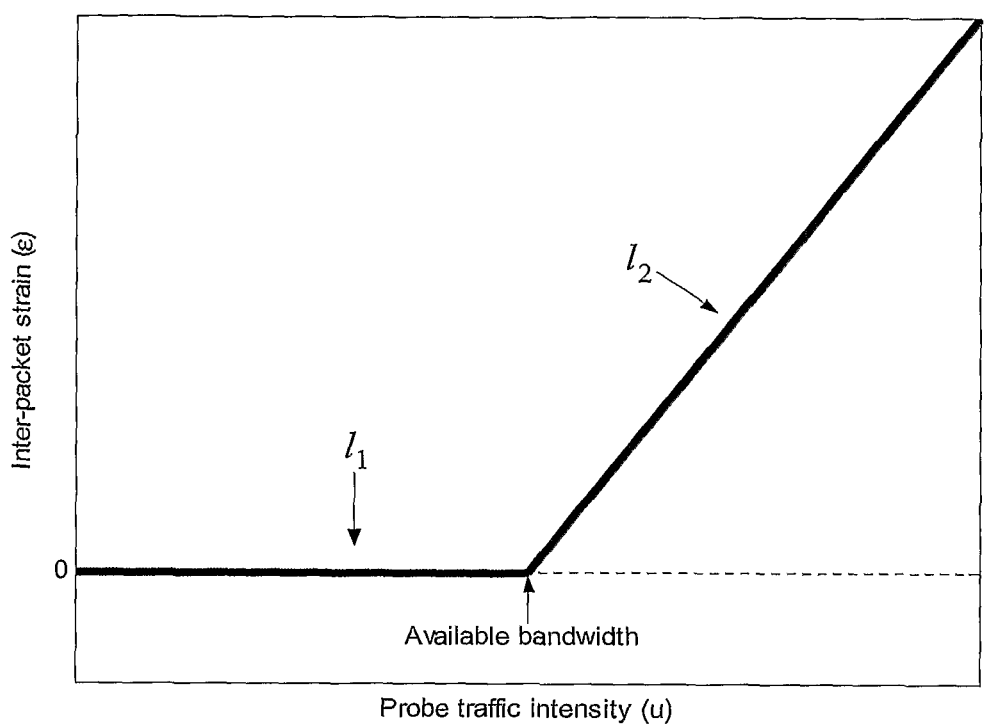
FIG. 1 is a graphical representation of a model of inter-packet strain ($\epsilon$) as a function of the probe-traffic intensity (u)

The expected value of $\epsilon$ is zero when the probing rate u is less than the available bandwidth B, and grows in proportion to the overload when the probing rate is greater than the break point 10 where the probe packets momentarily cause congestion in the bottleneck router. Hence, the strain $\epsilon$ can be expressed as:

$$\varepsilon = \begin{cases} 0 & (u < B) \\ \alpha(u - B) = \alpha u + \beta & (u \geq B) \end{cases} \quad (2)$$

where $\alpha$ and $\beta$ are the parameters of the sloping straight line $l_2$ in FIG. 1, and the available bandwidth corresponds to the intersection of the line $l_2$ with the axis $\epsilon=0$.

By varying the probe-packet rate u at the probe injector and identifying the point where $\epsilon$ starts to deviate from zero at the receiver, a way of estimating the available bandwidth of the bottleneck link and, thus, of the entire end-to-end path is obtained. By estimating the parameters $\alpha$ and $\beta$, the breakpoint B can easily be determined.

The measurement model of equation (2) is based on a fluid model of the traffic along the measured path. Therefore, it should be noted that when going beyond the fluid model and taking packet-level interactions in router queues into account, the system measurement model curve is expected to deviate somewhat from the form in FIG. 1. However, the asymptotic behavior remains. Furthermore, the model assumes that congestion only occurs in one router along the network path. The number of breakpoints in FIG. 1 corresponds to the number of congestion points in the path. In case of multiple congested routers, several measurement tools may deliver erroneous estimates; however, the E-MAP method of the present invention is designed to handle this situation due to the properties of the EM algorithm.

The EM algorithm has been applied for a wide range of estimation problems in statistics. The algorithm is used for finding the maximum-likelihood estimates from incomplete data, which can be seen as a set of observations. In the present invention, the EM algorithm is used for parameter estimation of straight lines in the context of network bandwidth estimation.

Referring again to FIG. 1, the asymptotic relation between available bandwidth, probe-traffic intensity (u), and inter-packet strain ($\epsilon$) is shown. Transmission of a probe-packet chirp typically yields strain measurements ($\epsilon$) along both the horizontal line ($l_1$) and the sloping straight line ($l_2$) since numerous probe-traffic rates are used within one chirp. In order to estimate the available bandwidth B, the parameters of the sloping straight line $l_2$ must be determined.

The EM algorithm is iterative and consists of two steps, the Expectation step (E-step) and the Maximization step (M-step). In the E-step, it is assumed that the parameters of the straight lines $l_1$ and $l_2$ are known. In the M-step, it is assumed that it is known which strain measurements belong to $l_1$ and $l_2$, respectively.

Initially, the EM algorithm allows random parameter values to be chosen to model $l_1$ and $l_2$.

In the E-step the strain measurements $\epsilon_i$ (i=1, 2, ..., N−1, where N is the number of probe packets in a chirp) are assigned to the model $l_1$ or $l_2$ that fits best. This may be accomplished by computation of the two residuals $r_1$ and $r_2$, one for each line using the equations:

$$r_1(i) = \hat{\alpha}_1 u_i + \hat{\beta}_1 - \epsilon_i \quad (3)$$

$$r_2(i) = \hat{\alpha}_2 u_i + \hat{\beta}_2 - \epsilon_i \quad (4)$$

The estimated parameters of $l_1$ and $l_2$ are denoted as $(\hat{\alpha}_1, \hat{\beta}_1)$ and $(\hat{\alpha}_2, \hat{\beta}_2)$, respectively. $u_i$ is the probe rate for the strain measurement $\epsilon_i$ in the chirp. The residuals correspond to the difference between the measured strains $\epsilon_i$ and the prediction of these measurements according to the current estimates of the parameters of the straight lines.

Given the residuals, the E-step proceeds by calculating the weights $w_1$ and $w_2$:

$$w_1(i) = \frac{e^{-r_1^2(i)/\sigma_1^2(i)}}{e^{-r_1^2(i)/\sigma_1^2(i)} + e^{-r_2^2(i)/\sigma_2^2(i)}} \quad (5)$$

$$w_2(i) = \frac{e^{-r_2^2(i)/\sigma_2^2(i)}}{e^{-r_1^2(i)/\sigma_1^2(i)} + e^{-r_2^2(i)/\sigma_2^2(i)}} \quad (6)$$

The weights actually correspond to probabilities. $w_1(i)$ is the probability that strain measurement $\epsilon_i$ belongs to $l_1$ and $w_2(i)$ is the probability that $\epsilon_i$ belongs to $l_2$. Consequently, the sum of $w_1(i)$ and $w_2(i)$ is one. With respect to (5) and (6), the residuals may be modeled as normally distributed random variables with zero mean and variance $\sigma^2$. The parameter $\sigma$ corresponds to the expected noise level in the strain measurements, which can be used as a tuning parameter in E-MAP to enhance the performance.

In the M-step, the calculated weights are used to update the estimated parameters of $l_1$ and $l_2$. This may be accomplished by solving two weighted least squares equations with respect to $(\hat{\alpha}_1, \hat{\beta}_1)$ and $(\hat{\alpha}_2, \hat{\beta}_2)$:

$$\begin{bmatrix} \sum_i w_1(i)u_i^2 & \sum_i w_1(i)u_i \\ \sum_i w_1(i)u_i & \sum_i w_1(i)\cdot 1 \end{bmatrix} \begin{bmatrix} \hat{\alpha}_1 \\ \hat{\beta}_1 \end{bmatrix} = \begin{bmatrix} \sum_i w_1(i)u_i\epsilon_i \\ \sum_i w_1(i)\epsilon_i \end{bmatrix} \quad (7)$$

$$\begin{bmatrix} \sum_i w_2(i)u_i^2 & \sum_i w_2(i)u_i \\ \sum_i w_2(i)u_i & \sum_i w_2(i)\cdot 1 \end{bmatrix} \begin{bmatrix} \hat{\alpha}_2 \\ \hat{\beta}_2 \end{bmatrix} = \begin{bmatrix} \sum_i w_2(i)u_i\epsilon_i \\ \sum_i w_2(i)\epsilon_i \end{bmatrix} \quad (8)$$

The above equations (3) through (8) assume there is only one breakpoint in the measurement model, as shown in FIG. 1. If a probe chirp includes high probe rates that cause congestion at two routers along the path, a second breakpoint is expected. This can be handled by introducing a third line ($l_3$) in the EM algorithm, although the parameters of $l_2$ are still of primary interest since $l_2$ points out the first breakpoint, which equals the minimum unused capacity of the network path. This reasoning holds for multiple congested routers.

Figure 3:
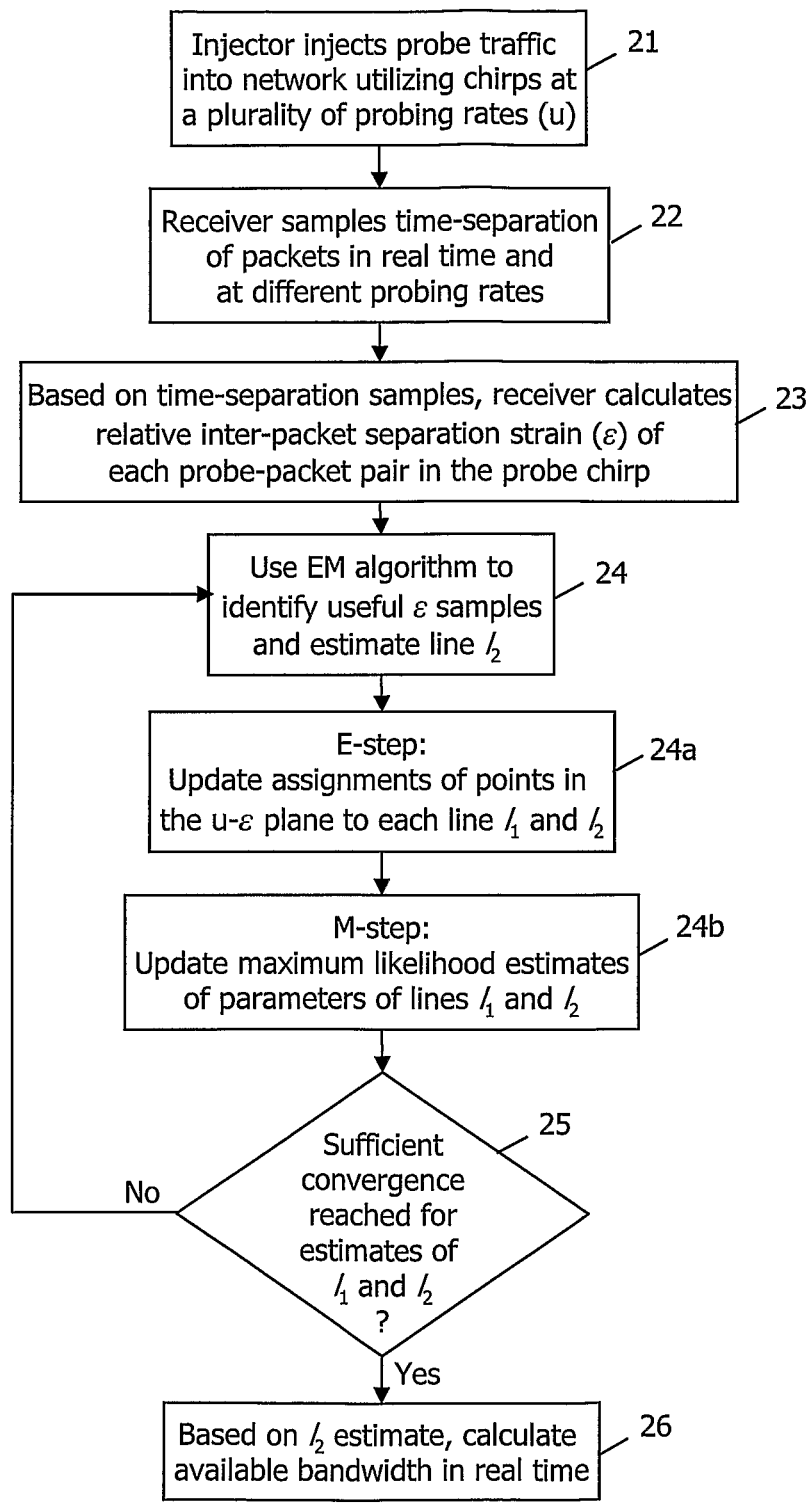
FIG. 3 is a flow chart illustrating the steps of an exemplary embodiment of the method of the present invention.

FIG. 3 is a flow chart illustrating the steps of an exemplary embodiment of the method of the present invention. At step 21, the multi-rate packet chirp injector 12 injects a sequence of probe packets into the network. The probe packets may be organized as individual pairs or trains of several packets. At step 22, the receiver 16 samples the time-separation of packets in real time at several points. At step 23, based on time-separation samples and knowledge of the probe chirp characteristics, the receiver calculates the relative inter-packet time separation strain $\epsilon$ of each probe-packet pair in the probe chirp. At step 24, the E-M analyzer 17 then utilizes the EM algorithm to identify useful strain $\epsilon$ samples and estimate the line $l_2$. The EM analyzer estimates both $l_1$ and $l_2$ in parallel so that it can be determined which points in the u-$\epsilon$ plane are associated with which line.

At sub-step 24a, the E-M analyzer performs the E-step of the EM algorithm by updating the assignments of the points in the u-$\epsilon$ plane to each line $l_1$ and $l_2$. At sub-step 24b, the E-M analyzer performs the M-step of the EM algorithm by updating the maximum likelihood estimates of the parameters of lines $l_1$ and $l_2$. At step 25, it is determined whether sufficient convergence has been reached for the estimates of the parameters of lines $l_1$ and $l_2$. If not, the method returns to step 24 and performs another iteration of the EM algorithm. When sufficient convergence has been reached, the method moves to step 26 where the available bandwidth is calculated in real time based on the $l_2$ estimate.

The E-MAP method may also apply the filter 18 for enhanced tracking performance of the available bandwidth. The parameters of $l_2$ are directly estimated using an EM-based multiple-line-fitting approach, and a vector containing the final EM estimates of $\alpha_2$ and $\beta_2$ is input to the filter. The output is a filtered, enhanced estimate of $l_2$, and thus an estimate of the available bandwidth, which occurs at the intersection of $l_2$ and the axis of zero inter-packet strain ($\epsilon$).

Figure 4:
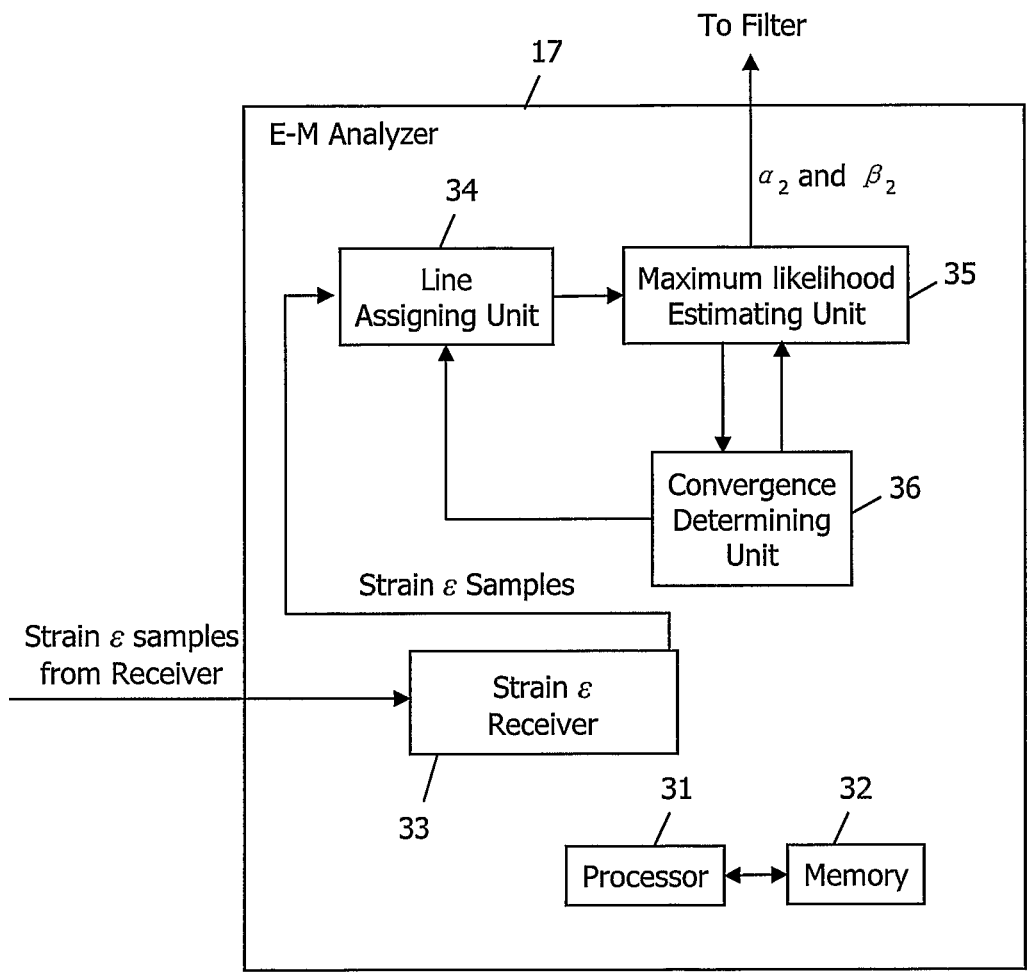
FIG. 4 is a simplified block diagram of an exemplary embodiment of an Expectation-Maximization (E-M) Analyzer of the present invention.

FIG. 4 is a simplified block diagram of an exemplary embodiment of an Expectation-Maximization (E-M) analyzer 17 of the present invention. The processes performed by the E-M analyzer may be controlled by a processor 31 running control software stored in a memory 32. A strain $\epsilon$ receiver 33 receives the strain $\epsilon$ samples from the receiver 16 and supplies the strain $\epsilon$ samples to a line assigning unit 34, which performs the E-step of the EM algorithm by updating the assignments of the points in the u-$\epsilon$ plane to each line $l_1$ and $l_2$. A maximum likelihood estimating unit 35 performs the M-step of the EM algorithm by updating the maximum likelihood estimates of the parameters of lines $l_1$ and $l_2$. A convergence determining unit 36 determines whether sufficient convergence has been reached between the estimated parameters of lines $l_1$ and $l_2$ and the strain $\epsilon$ samples. If not, the convergence determining unit causes the line assigning unit to begin another iteration of the EM algorithm. When sufficient convergence has been reached, the maximum likelihood estimating unit sends the $l_2$ estimate ($\alpha$ and $\beta$) to the filter 18 where the available bandwidth is calculated in real time based on the $l_2$ estimate.

As an outcome of the iterations of the loop performed by the line assigning unit 34, the maximum likelihood estimating unit 35, and the convergence determining unit 36, the E-M analyzer identifies useful strain $\epsilon$ samples and discards samples that are not useful.

An implementation of the E-MAP method of the present invention has been evaluated through three different simulations in a network simulator. Regarding the E-MAP configuration, a new chirp was transmitted every second. One chirp consisted of 17 probe packets, where each packet was 1500 bytes. The probe rates within a chirp were uniformly distributed in the interval $1.0 \leq u \leq 20.0$ Mbit/s and $0.3 \leq u \leq 3.0$ Mbit/s for the wired and wireless case, respectively.

Figure 5:
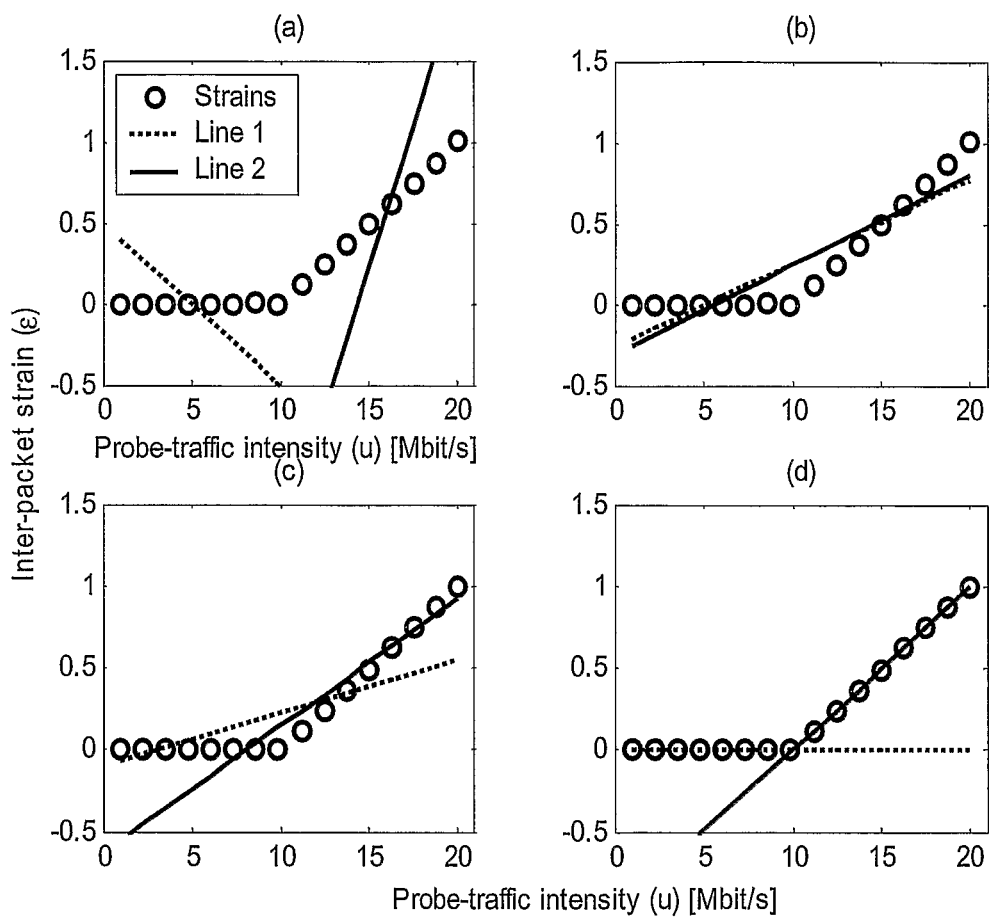
FIG. 5 illustrates four graphical representations of inter-packet strain ($\epsilon$) as a function of probe-traffic intensity (u) for different numbers of iterations of the EM algorithm in a scenario utilizing a wired bottleneck link with C=10 Mbit/s and no cross traffic.

FIG. 5 illustrates four graphical representations of inter-packet strain ($\epsilon$) as a function of probe-traffic intensity (u) for a first scenario. In the first scenario, the bottleneck was a wired link with capacity C=10 Mbit/s and no cross traffic was activated, i.e., X=0 bit/s. This simple case makes it easy to illustrate the fundamental strategy of E-MAP, since the measured strains appear along straight lines as in FIG. 1. More complex and realistic scenarios result in strain measurements that deviate from the ideal linear curves in equation (2), due to cross-traffic interaction and/or variations of the bottleneck-link capacity.

Subfigure 5(a) illustrates the initial estimates of the two lines in the measurement model, i.e., $l_1$ and $l_2$ according to FIG. 1. Subfigures 5(b)-5(d) illustrate the output of the EM algorithm after 1, 2, and 8 iterations, respectively. The strain measurements are obtained from one probe chirp. Sixteen measurements are obtained from one chirp, since seventeen consecutive packets in a chirp constitute sixteen pairs. Although the initial estimates of $l_1$ and $l_2$ in Subfigure 5(a) are rather poor, the EM algorithm eventually converges to maximum likelihood estimates that completely coincide with the strain measurements. Since $l_2$ crosses the $\epsilon=0$ axis at u=10 Mbit/s, the estimated parameters of $l_2$ make it easy to calculate a correct estimate of the available bandwidth B.

The line $l_1$ is expected to be approximately horizontal and in an ideal world will converge to the $\epsilon=0$ axis. In reality, there may be some deviation as line $l_1$ accounts for u-$\epsilon$ points not included in line $l_2$. Since the line $l_2$ is expected to have a positive slope and a negative interception value, it is of course feasible to make an initial guess of $l_1$ and $l_2$ that is more reasonable than the one in Subfigure 5(a). However, this is not of great importance for the overall performance of the method, although it may speed up the convergence of the parameter estimation.

Figure 6:
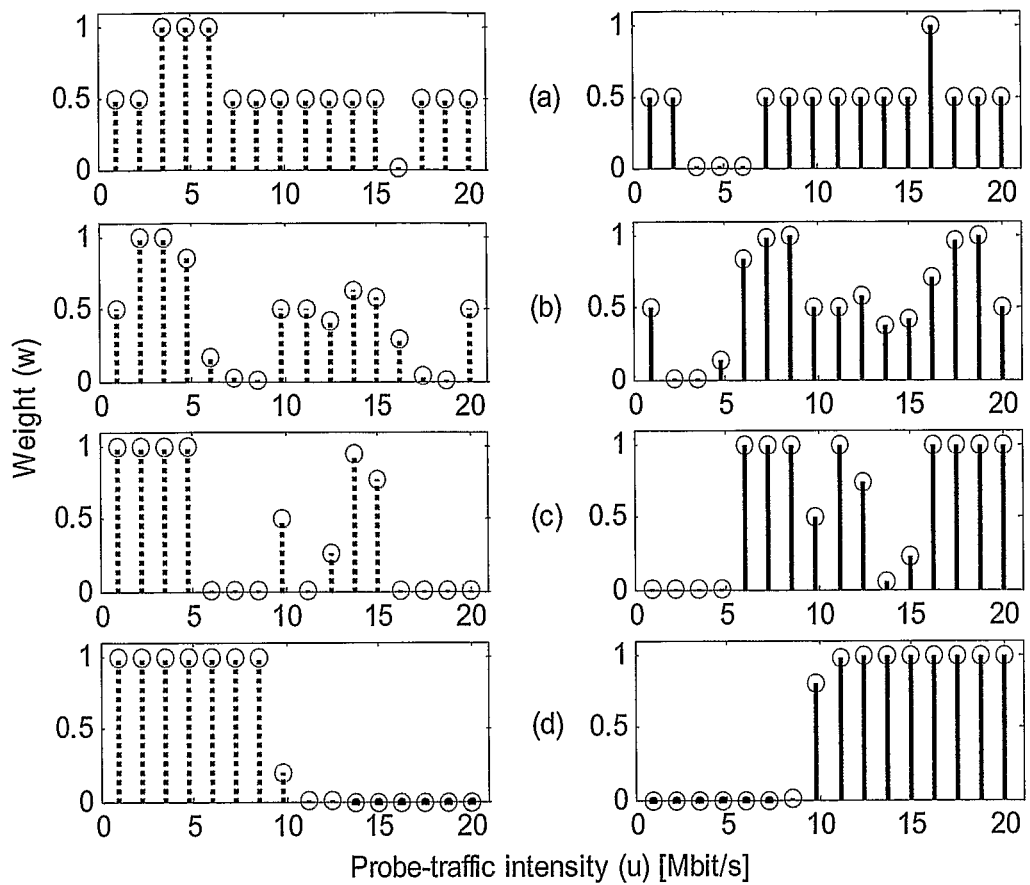
FIG. 6 illustrates four graphical representations of the weights $w_1$ and $w_2$ that correspond to the iterations of the EM algorithm in FIG. 5.

FIG. 6 illustrates four graphical representations of the weights $w_1$ (left) and $w_2$ (right) that correspond to the iterations of the EM algorithm in FIG. 5. The weights are calculated in the E-step of the EM algorithm. Subfigure 6(a) shows the weights after the first E-step computation. These weights are based on the initial estimates of $l_1$ and $l_2$. Subfigures 6(b)-6(d) illustrate the calculated weights after 2, 3, and 8 E-step iterations, respectively. In Subfigure 6(a), it can be seen that the EM algorithm is initially rather uncertain whether the strain measurements belong to $l_1$ or $l_2$. The algorithm believes that measurements $\epsilon_3$-$\epsilon_5$ belong to $l_1$ and measurement $\epsilon_{13}$ belongs to $l_2$, since the weight regarding these measurements equals one. For the other measurements, the weight is 0.5 with respect to both $l_1$ and $l_2$, which is due to large residuals $r_1$ and $r_2$, as defined in equations (3) and (4) above.

As the EM algorithm updates its estimates of $l_1$ and $l_2$, it becomes clear whether the strain measurements belong to $l_1$ or $l_2$. Referring to Subfigure 6(d), the algorithm has converged to its final estimates and the weights $w_1$ and $w_2$ show that the algorithm is confident that the measurements $\epsilon_1$-$\epsilon_7$ belong to $l_1$ and the measurements $\epsilon_9$-$\epsilon_{16}$ belong to $l_2$. Note that $w_1(8)$ is slightly larger than zero and $w_2(8)$ is slightly smaller than one. This is because both $l_1$ and $l_2$ overlap with $\epsilon_8$ as shown in Subfigure 5(d).

Figure 7:
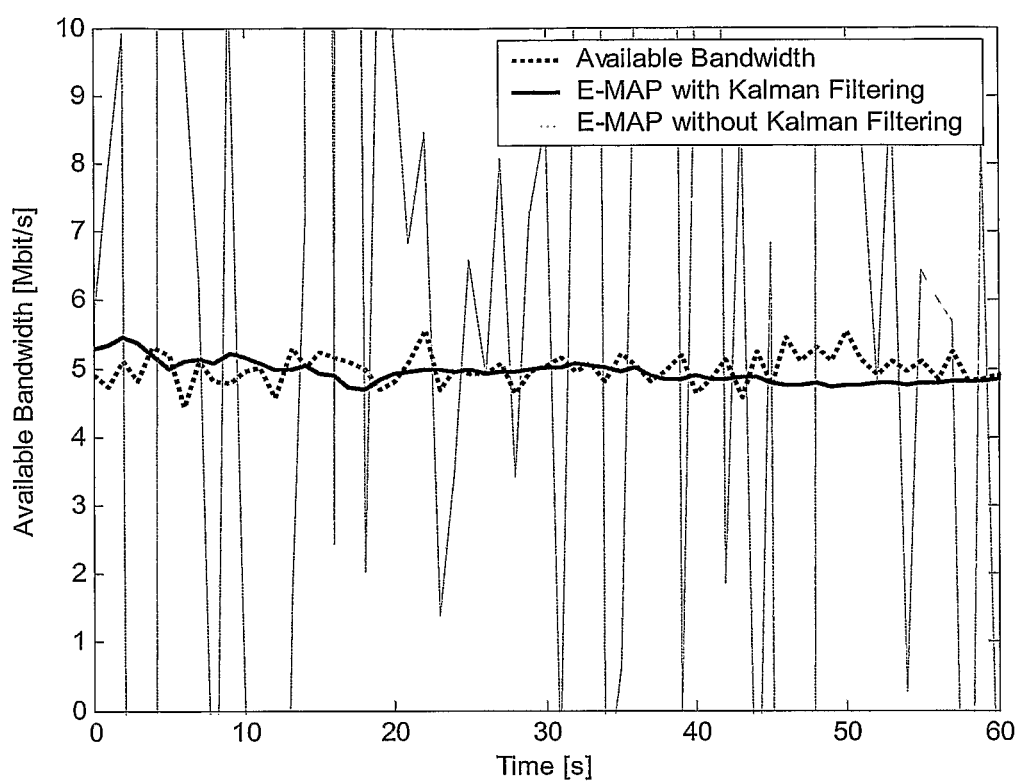
FIG. 7 is a graphical representation of available bandwidth as a function of time, illustrating the E-MAP estimation of the available bandwidth with and without Kalman filtering in a scenario in which the bottleneck link is a wired link with capacity C=10 Mbit/s and the probe chirps interact with Pareto-distributed cross-traffic at the bottleneck router.

FIG. 7 is a graphical representation of available bandwidth as a function of time, illustrating the E-MAP estimation of the available bandwidth with and without Kalman filtering in a second scenario in which the bottleneck link is a wired link with capacity C=10 Mbit/s and the probe chirps interact with Pareto-distributed cross-traffic at the bottleneck router. In this scenario, cross traffic continuously affected the bottleneck router. The cross traffic is described as an aggregation of 100 traffic sources, where each single cross-traffic source transmits packets with various sizes and with inter-departure times following a Pareto distribution. The traffic sources were configured such that the average cross-traffic intensity of the aggregated traffic stream was X=5 Mbit/s.

The dotted curve in FIG. 7 corresponds to the true available bandwidth, which is obtained by subtracting the cross-traffic intensity from the bottleneck-link capacity. The cross traffic is calculated by averaging the content of cross-traffic traces using a sliding window with averaging time scale $\tau$=1 second.

The thin solid curve corresponds to the E-MAP estimate without Kalman filtering; i.e., simply using the parameter estimates of $l_2$ from the EM algorithm to compute the breakpoint 10. The variability of the estimates is rather high and fluctuates around the true available bandwidth at 5 Mbit/s.

The thick solid curve depicts the performance of E-MAP when the output of the EM algorithm is forwarded to a Kalman filter. The Kalman filter generates an updated estimate of the available bandwidth by combining the EM estimate of $l_2$ with the previous Kalman-filter estimate of $l_2$. The weight given to the new Kalman-filter input is defined with respect to expected noise variations in the Kalman filter system model and the precision of the EM estimate of $l_2$.

The available-bandwidth estimates after Kalman filtering are fairly close to the true available bandwidth. In general, the performance of the E-MAP method is improved when utilizing a Kalman filter. The filter also provides opportunities for tuning the E-MAP method with respect to properties such as stability and agility.

Figure 8:
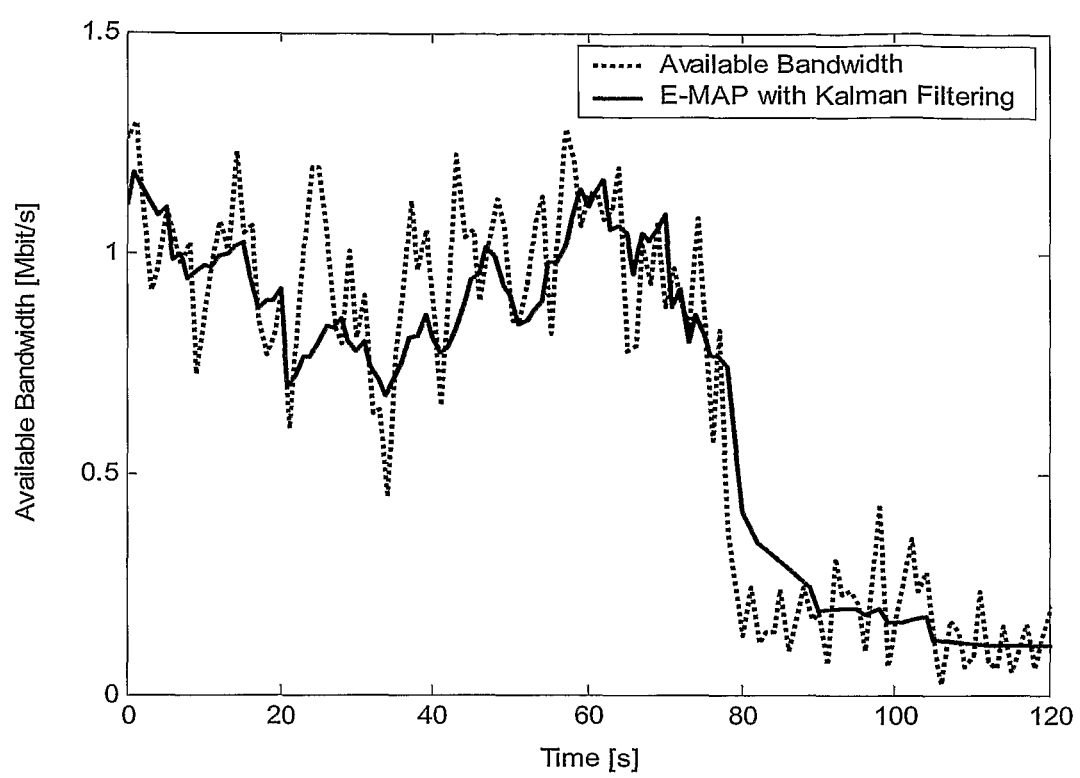
FIG. 8 is a graphical representation of available bandwidth as a function of time, illustrating the performance of the E-MAP method with Kalman filtering in a scenario in which the bottleneck link is a wireless link and the available bandwidth is subject to extensive fluctuations.

FIG. 8 is a graphical representation of available bandwidth as a function of time, illustrating the performance of the E-MAP method with Kalman filtering when the available bandwidth is subject to extensive fluctuations in a third scenario. For this case, the bottleneck link was a wireless link, where the radio channel was simulated as a Rayleigh-fading channel. More specifically, the bottleneck was simulated as a high-speed downlink shared channel (HS-DSCH), which is used for HSDPA in the third generation mobile communication system UMTS.

The true available bandwidth (dotted line) corresponds to the highest achievable throughput (i.e., the value of C), which varies with time due to fluctuating radio-channel conditions. The true available bandwidth is defined as the average throughput capacity using a sliding window with $\tau$=1 second. As can be seen in FIG. 8, the E-MAP method provides results that track the general trend of the available-bandwidth quite closely. There is some lag with respect to the high-frequency variations, but as would be understood by those skilled in the art, suitable configuration of the Kalman filter can speed up the reaction time of the E-MAP method.

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention as defined by the following claims.

The invention claimed is:

1. A method of determining end-to-end available bandwidth of a path in a packet-switched communication network, said method comprising the steps of:
    injecting probe traffic packets into the network utilizing a probe chirp comprising a plurality of probe traffic packets, wherein at least some of the probe traffic packets are sent at different probing rates, u;
    sampling by a receiver, time separation of the probe traffic packets to generate time-separation samples;
    calculating relative inter-packet separation strain, $\epsilon$, samples of the probe traffic packets in the probe chirp utilizing the time-separation samples at different probing rates;
    utilizing an Expectation-Maximization, EM, algorithm to identify useful strain $\epsilon$ samples and to estimate parameters of a line $l_2$ representing a direct linear relationship between the probing rate and the inter-packet separation strain $\epsilon$ at probing rates greater than a break point; and
    calculating the available bandwidth of the network path in real time based on the estimated parameters of the line $l_2$.

2. The method as recited in claim 1, wherein the step of calculating the available bandwidth includes determining the probing rate at a point at which the line $l_2$ intersects an axis $\epsilon=0$.

3. The method as recited in claim 1, wherein the step of injecting probe traffic packets into the network includes injecting probe traffic packets organized as individual pairs of packets sent at different probing rates.

4. The method as recited in claim 1, wherein the step of injecting probe traffic packets into the network includes injecting probe traffic packets organized as trains of several packets sent at different probing rates.

5. The method as recited in claim 1, wherein the step of utilizing the EM algorithm to identify useful strain $\epsilon$ samples and to estimate parameters of the line $l_2$ includes:
   assigning calculated points in the u-$\epsilon$ plane at each probing rate to a line $l_2$ and to a line $l_1$; and
   determining maximum likelihood estimates of the parameters of lines $l_1$ and $l_2$.

6. The method as recited in claim 5, further comprising, after determining the maximum likelihood estimates of the parameters of lines $l_1$ and $l_2$, the steps of:
   determining whether sufficient convergence has been reached between the calculated points in the u-$\epsilon$ plane and the estimated parameters of lines $l_1$ and $l_2$;
   performing additional iterations of the EM algorithm if sufficient convergence has not been reached; and
   calculating the available bandwidth of the network path when sufficient convergence has been reached, wherein the available bandwidth equates to the probing rate at which line $l_2$ intersects the axis $\epsilon=0$.

7. The method as recited in claim 5, wherein the step of utilizing the EM algorithm to identify useful strain $\epsilon$ samples and to estimate parameters of the line $l_2$ includes:
   directly estimating the parameters of line $l_2$ utilizing an EM-based multiple-line-fitting approach;
   inputting a vector containing the final EM estimates of line $l_2$ to a filter; and
   outputting a filtered, enhanced estimate of line $l_2$ from the filter.

8. The method as recited in claim 7, wherein the step of inputting a vector containing the final EM estimates of line $l_2$ to a filter includes inputting the vector to a Kalman filter.

9. A system for determining end-to-end available bandwidth of a path in a packet-switched communication network, said system comprising:
   a multi-rate packet chirp injector for injecting probe traffic packets into the network utilizing a probe chirp comprising a plurality of probe traffic packets, wherein at least some of the probe traffic packets are sent at different probing rates, u;
   a receiver for sampling time separation of the probe traffic packets to generate time-separation samples at different probing rates, and for calculating relative inter-packet separation strain, $\epsilon$, samples of the probe traffic packets in the probe chirp utilizing the time-separation samples at different probing rates;
   an Expectation-Maximization, EM, analyzer comprising:
      means for utilizing an EM algorithm to identify useful strain $\epsilon$ samples and to estimate parameters of a line $l_2$ representing a direct linear relationship between the probing rate and the inter-packet separation strain $\epsilon$ at probing rates greater than a break point; and
      output means for outputting the estimated parameters of the line $l_2$; and
   a filter that receives the estimated parameters of the line $l_2$, said filter for determining the available bandwidth of the network path based on the estimated parameters of the line $l_2$.

10. The system as recited in claim 9, wherein the multi-rate packet chirp injector includes means for injecting probe traffic packets organized as individual pairs of packets sent at different probing rates.

11. The system as recited in claim 9, wherein the multi-rate packet chirp injector includes means for injecting probe traffic packets organized as trains of several packets sent at different probing rates.

12. The system as recited in claim 9, wherein the means for utilizing the EM algorithm to identify useful strain $\epsilon$ samples and to estimate parameters of the line $l_2$ includes:
   means for assigning calculated points in a u-$\epsilon$ plane to the line $l_2$ and to a line $l_1$; and
   means for determining maximum likelihood estimates of the parameters of lines $l_1$ and $l_2$.

13. The system as recited in claim 12, further comprising:
   means for analyzing the maximum likelihood estimates of the parameters of lines $l_1$ and $l_2$ to determine whether sufficient convergence has been reached between the calculated points in the u-$\epsilon$ plane and the estimated parameters of lines $l_1$ and $l_2$; and
   means for performing additional iterations of the EM algorithm if sufficient convergence has not been reached;
   wherein the output means for outputting the estimated parameters of the line $l_2$ outputs the estimated parameters when sufficient convergence has been reached; and
   wherein the filter determines the available bandwidth as the probing rate at which line $l_2$ intersects the axis $\epsilon=0$.

14. The system as recited in claim 12, wherein the means for utilizing the EM algorithm to identify useful strain $\epsilon$ samples and to estimate parameters of the line $l_2$ includes:
   means for directly estimating the parameters of line $l_2$ utilizing an EM-based multiple-line-fitting approach;
   wherein the output means outputs a vector containing the final EM estimates of line $l_2$ to the filter; and
   wherein the filter outputs a filtered, enhanced estimate of line $l_2$.

15. The system as recited in claim 9, wherein the filter is a Kalman filter.

16. An Expectation-Maximization, EM, analyzer for use in a system for determining end-to-end available bandwidth of a path in a packet-switched communication network, said system having a multi-rate packet chirp injector that injects probe traffic packets into the network, wherein at least some of the probe traffic packets are sent at different probing rates, said EM analyzer comprising:
   means for receiving inter-packet separation strain, $\epsilon$, samples from a strain $\epsilon$ calculating device, said strain $\epsilon$ samples being taken at a plurality of different probing rates, u;
   means for estimating parameters of a line $l_2$ and a line $l_1$, utilizing an EM-based multiple-line-fitting approach, said means for estimating parameters including:
      a line assigning unit for assigning calculated points in a u-$\epsilon$ plane to a line $l_2$ and to a line $l_1$; and
      a maximum likelihood estimating unit for estimating parameters of the line $l_2$ representing a direct linear relationship between the strain $\epsilon$ and the probing rate at probing rates greater than a break point; and
   means for sending the maximum likelihood estimates of the parameters of the line $l_2$ to a filter for determining the available bandwidth of the network path based on the estimated parameters of the line $l_2$.

17. The EM analyzer as recited in claim 16, further comprising:
   means for analyzing the maximum likelihood estimates of the parameters of lines $l_1$ and $l_2$ to determine whether sufficient convergence has been reached between the calculated points in the u-$\epsilon$ plane and the estimated parameters of lines $l_1$ and $l_2$; and
   means for performing additional iterations of the EM algorithm if sufficient convergence has not been reached;
   wherein the means for sending the maximum likelihood estimates of the parameters of the line $l_2$ to a filter sends a vector containing the maximum likelihood estimates of line $l_2$ to the filter when sufficient convergence has been reached.

18. The EM analyzer as recited in claim 17, further comprising a Kalman filter for receiving the maximum likelihood estimates of the parameters of the line $l_2$ and for determining the available bandwidth of the network path based on the estimated parameters of the line $l_2$.

\* \* \* \* \*

UNITED STATES PATENT AND TRADEMARK OFFICE
CERTIFICATE OF CORRECTION

PATENT NO. : 8,503,320 B2  
APPLICATION NO. : 12/933875  
DATED : August 6, 2013  
INVENTOR(S) : Ekelin et al.

Page 1 of 1

It is certified that error appears in the above-identified patent and that said Letters Patent is hereby corrected as shown below:

In the Specification

In Column 1, Line 11, delete "entirety" and insert -- entirety. --, therefor.

In the Claims

In Column 10, Line 57, in Claim 1, delete "$1_2$." and insert -- $l_2$. --, therefor.

Signed and Sealed this
Fifteenth Day of July, 2014

Michelle K. Lee
*Deputy Director of the United States Patent and Trademark Office*